(12) United States Patent
Stantchev

(10) Patent No.: US 11,331,595 B2
(45) Date of Patent: May 17, 2022

(54) EXTRACTION APPARATUS AND METHOD THEREOF

(71) Applicant: George Stantchev, Phoenix, AZ (US)

(72) Inventor: George Stantchev, Phoenix, AZ (US)

( * ) Notice: Subject to any disclaimer, the term of this patent is extended or adjusted under 35 U.S.C. 154(b) by 435 days.

(21) Appl. No.: 15/398,073

(22) Filed: Jan. 4, 2017

(65) Prior Publication Data
US 2017/0113161 A1    Apr. 27, 2017

Related U.S. Application Data

(63) Continuation of application No. PCT/US2016/050460, filed on Sep. 7, 2016.

(60) Provisional application No. 62/215,104, filed on Sep. 7, 2015.

(51) Int. Cl.
| | |
|---|---|
| *B01D 11/04* | (2006.01) |
| *B01D 11/02* | (2006.01) |
| *B01D 3/40* | (2006.01) |
| *B01D 3/10* | (2006.01) |
| *B01D 33/03* | (2006.01) |
| *C11B 1/10* | (2006.01) |
| *C11B 9/02* | (2006.01) |
| *B01D 11/00* | (2006.01) |

(52) U.S. Cl.
CPC ............ *B01D 11/0296* (2013.01); *B01D 3/10* (2013.01); *B01D 3/40* (2013.01); *B01D 11/02* (2013.01); *B01D 11/0207* (2013.01); *B01D 11/028* (2013.01); *B01D 11/0284* (2013.01); *B01D 11/04* (2013.01); *B01D 11/0442* (2013.01); *B01D 11/0488* (2013.01); *B01D 33/03* (2013.01); *C11B 1/10* (2013.01); *C11B 9/025* (2013.01); *B01D 2011/002* (2013.01)

(58) Field of Classification Search
CPC .................................................. B01D 11/0296
See application file for complete search history.

(56) References Cited

U.S. PATENT DOCUMENTS

| | | | |
|---|---|---|---|
| 2,272,951 A | | 2/1942 | Morf et al. |
| 4,017,383 A | | 4/1977 | Beavon |
| 4,218,491 A | | 8/1980 | Laws et al. |
| 4,328,092 A | | 5/1982 | Sequeira, Jr. |
| 5,059,331 A | | 10/1991 | Goyal |
| 5,080,692 A | * | 1/1992 | Lee ........................... C10L 9/02 |
| | | | 44/624 |
| 5,707,673 A | | 1/1998 | Prevost et al. |
| 5,932,101 A | * | 8/1999 | Kanel ................ B01D 11/0407 |
| | | | 210/634 |

(Continued)

*Primary Examiner* — Donald R Spamer
(74) *Attorney, Agent, or Firm* — Rosenberg, Klein & Lee

(57) ABSTRACT

The present invention relates to an extraction apparatus for extracting at least one constituent in a substance. The extraction apparatus comprises an extractor, an extraction separator and an extraction condenser. The extractor is used to mix the substance and an extraction fluid, wherein the extraction fluid is a subcritical fluid. The extraction separator is connected to the extractor for receiving and heating the extraction fluid to gasify the extraction fluid and to separate the constituent and the gasified extraction fluid. The extraction condenser is connected to the extraction separator and the extractor for receiving and liquefying the gasified extraction fluid from the extraction separator and sending the liquefied extraction fluid to the extractor.

6 Claims, 12 Drawing Sheets

(56) References Cited

U.S. PATENT DOCUMENTS

| | | |
|---|---|---|
| 6,589,422 B2 | 7/2003 | Low |
| 2006/0041154 A1 | 2/2006 | Britt |
| 2009/0166175 A1 | 7/2009 | Waibel et al. |
| 2014/0163247 A1* | 6/2014 | Buese ................ B01D 11/0219 554/8 |
| 2014/0295049 A1* | 10/2014 | Ragot ....................... A23L 2/08 426/589 |

* cited by examiner

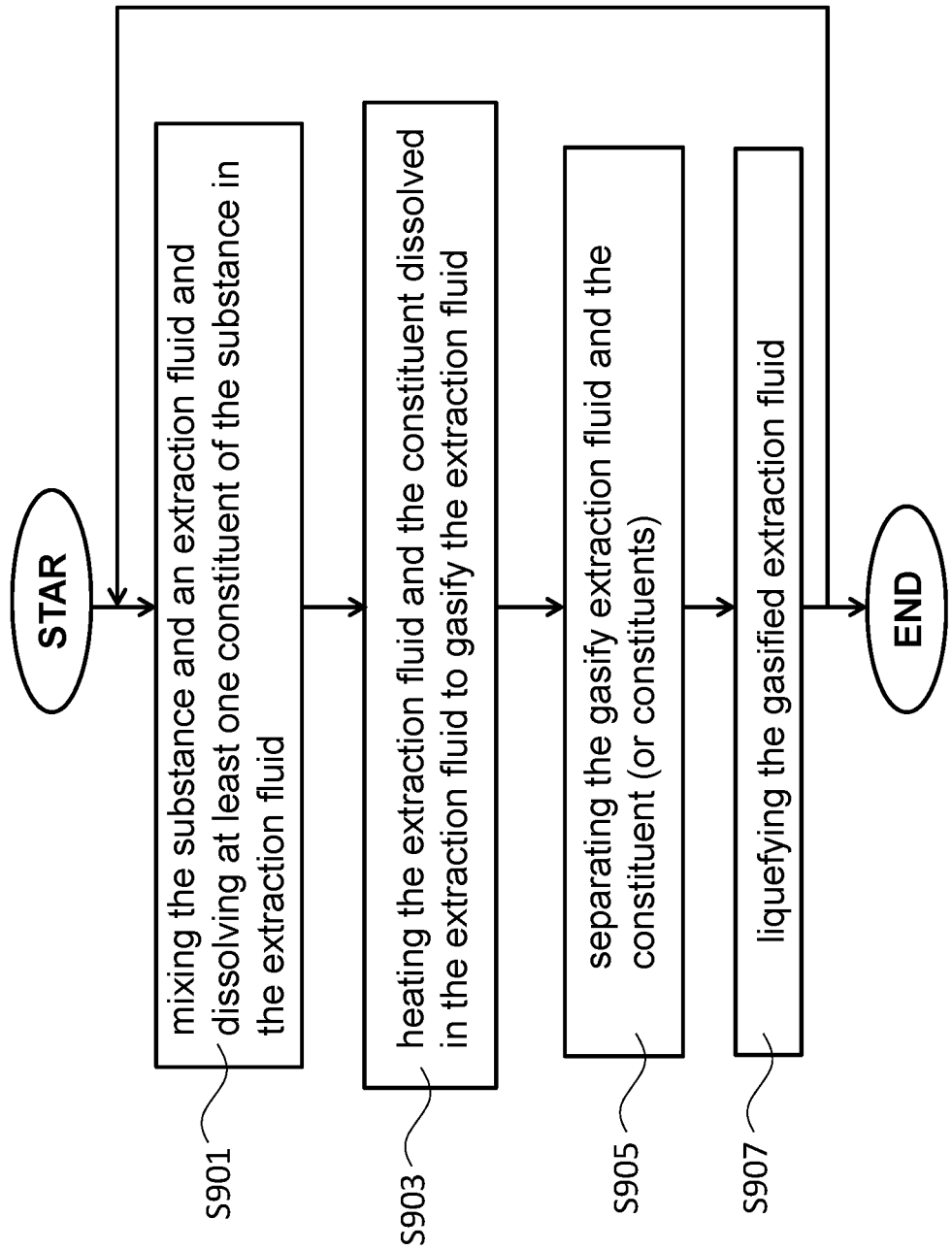

EXTRACTION APPARATUS AND METHOD THEREOF

REFERENCE TO RELATED APPLICATIONS

This application is a Continuation of Ser. No. PCT/US16/50460, filed Sep. 7, 2016, which claims benefit of Provisional Application Ser. No. 62/215,104, filed 7 Sep. 2015.

FIELD OF THE INVENTION

The present invention relates to an extraction apparatus and method thereof for extracting at least one constituent in a substance by an extraction fluid substituted by a subcritical fluid.

BACKGROUND

FIG. 1 is a general triple phase diagram of a substance. A substance can exist in three phases, gas, liquid or supercritical fluid and solid, depend on temperature and pressure. Point A is triple point, and point C is critical point. At Point A, whose temperature is T1 and pressure is P1, all three phases of a substance can exist at the same time. When pressure and temperature are higher than point C, whose temperature is T2 and pressure is P2, a substance will transfer into supercritical state or supercritical fluid. In supercritical state, a substance can perform gaseous feature and liquid feature at the same time.

Supercritical fluids are used in existed extraction method and equipment, but supercritical liquefied gases need to be operated under relative high pressure. For example, the supercritical pressure used with $CO_2$ is above 7.3 MPa, and the subcritical pressure used with tetrafluroethane is around 0.6 MPa. Therefore, supercritical fluid equipment requires high capital investment for pressurized equipment.

SUMMARY

It is one object of the present invention to provide an extraction method. At least one constituted of a substance can be extracted under a relative low pressure with a subcritical fluid, and users can perform the extraction process with reasonable costs.

For achieving above object, the present invention provides an extraction method comprising the following steps: mixing said substance and an extraction fluid, which is a subcritical fluid, and dissolving at least one constituent in the extraction fluid, heating the extraction fluid and the constituent dissolved in the extraction fluid to gasify the extraction fluid, separating the gasified the extraction fluid and the constituent (or constituents), and liquefying the gasified extraction fluid after separating the gasified extraction fluid and at least one constituent.

It is another object of the present invention to provide an extraction apparatus. At least one constituted of a substance can be extracted under a relative low pressure and there is no need to change pressure under the extraction process. Users can perform the extraction process with reasonable costs.

For achieving above object, the present invention provides an extraction apparatus, which introduces a subcritical fluid as an extraction fluid, comprises an extractor, an extraction evaporator unit, an extraction separator, and an extraction condenser. The extraction apparatus extracts at least one constituent in a substance by dissolving the constituent (or constituents) in the extraction fluid, and then heating the extraction fluid and the constituent (or constituents) dissolved in the extraction fluid to gasify the extraction fluid. Therefore, the constituent (or constituents) and the extraction fluid can be separated.

It is another object of the present invention to provide an extraction apparatus. At least one constituted of a substance can be extracted under a relative low pressure with an extraction fluid. A needle valve is introduced for adjusting the flow rate of the extraction flow, and then the pressure of the gasified extraction fluid can be changed. In this way, the extraction efficiency will be improved.

For achieving above object, the present invention provides an extraction apparatus, which introduces a subcritical fluid as an extraction fluid, comprises an extractor, a needle valve, an extraction separator, and an extraction condenser. The extraction apparatus extracts at least one constituent in a substance by dissolving the constituent (or constituents) in the extraction fluid, and then lowering the pressure of the extraction fluid and the constituent (or constituents) dissolved in the extraction fluid before heating them to gasify the extraction fluid. Therefore, the constituent (or constituents) and the extraction fluid can be separated.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which:

FIG. 12 is a flow chart of an extraction method according to another embodiment of the present invention.

DETAILED DESCRIPTION OF THE PREFERRED EMBODIMENTS

Figure 1:
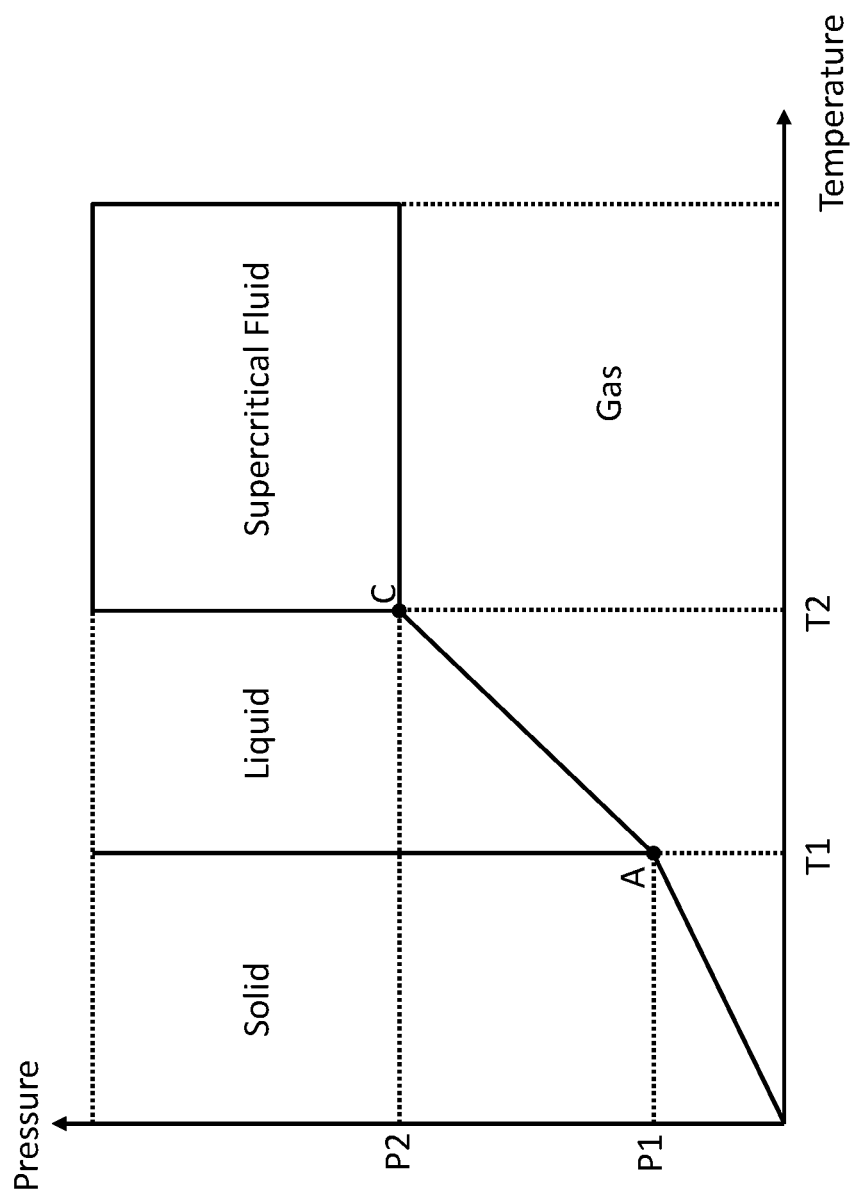
FIG. 1 is a general triple phase diagram of a substance.
Figure 2:
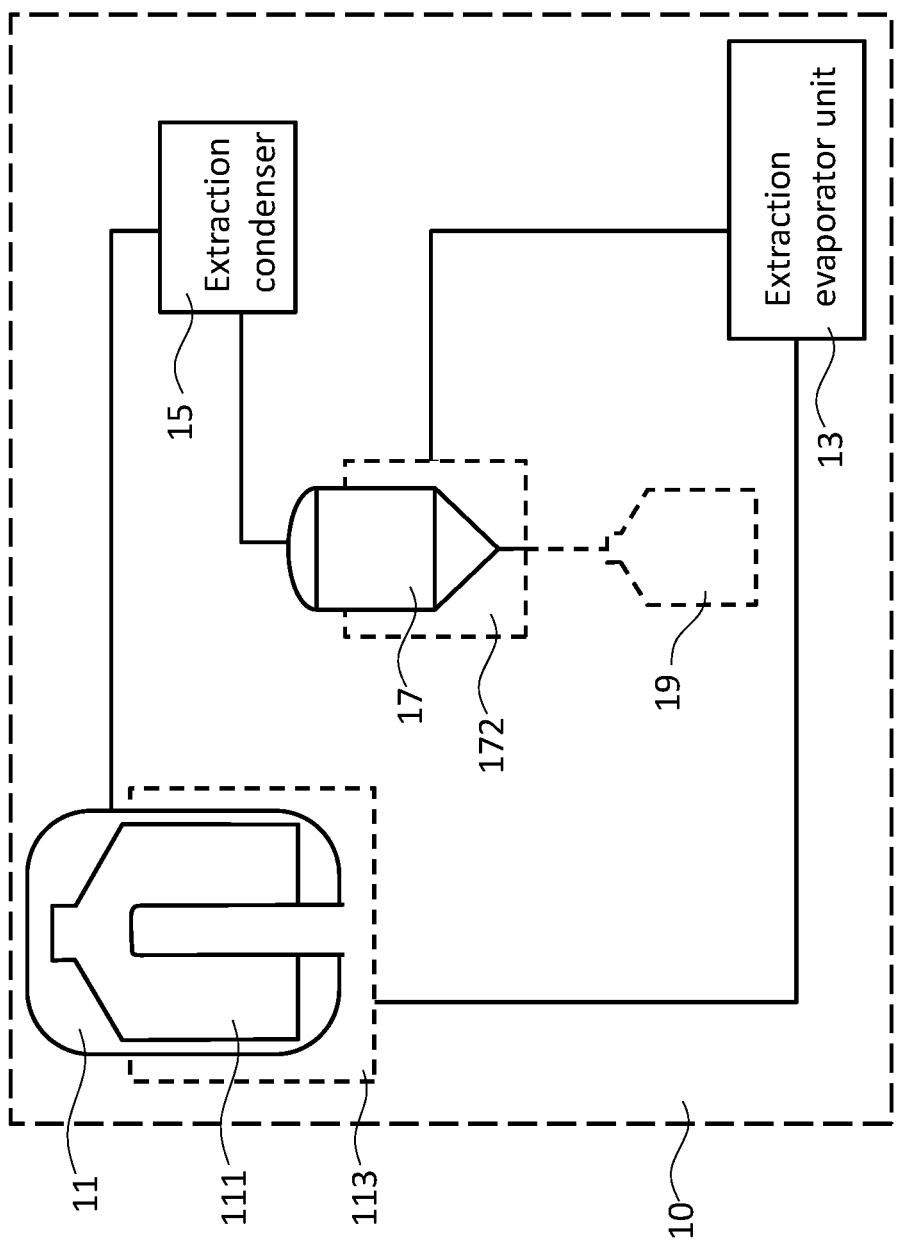
FIG. 2 is a block diagram of an extraction apparatus according to the first embodiment of the present invention.

FIG. 2 is a block diagram of an extraction apparatus according to the first embodiment of this invention. The extraction apparatus 10, which is used for extracting at least one constituent in a substance, comprises an extractor 11, an extraction evaporator unit 13, an extraction separator 17 and an extraction condenser 15. The extractor 11 is used to mix the substance and extraction fluid, and the extraction fluid is a subcritical fluid.

A subcritical fluid (or a fluid in subcritical state) is a liquefied gas, which is obtained by increasing pressure to let gas passes into liquid existence when the temperature of the gas is higher than boiling point and less than critical point. Applying a subcritical fluid to an extraction fluid offers the advantages that the extraction equipment and the extraction process can operate under relative low pressure compared with a highly pressurized liquid in its supercritical state.

Hydrofluorocarbon (HFC) refrigerants and in particular the tetrafluoroethane are becoming very popular solvents for botanicals due their ability to directly and selectively extract mobile liquid fragrant oils but not solid waxy concretes. In the present invention the tetrafluoroethane (TFE) term is used as reference to standard refrigerants as R134a, R143a, R23 and mixtures thereof as example R404a, R407, R410, R417, R422, R507, R508 etc. with safety index A1.

In one embodiment of the present invention, the extraction fluid is R134a, R143a, R23 and/or mixtures thereof R404a, R407, R410, R417, R422, R507, R508 with safety index A1.

The extractor 11 is also used to extract the constituent (or constituents) by dissolving the constituent (or constituents) in the extraction fluid, and the extractor 11 comprises a stirrer 111 for stirring and mixing the substance and the extraction fluid to increase extraction efficiency.

In one embodiment of this invention, the extractor 11 further comprises a temperature control unit 113. The temperature control unit 113 is used to control the temperature of the extractor 11 to fine control the phase of the extraction fluid while in subcritical state and make the constituent (or constituents) dissolved in the extraction fluid.

The extraction evaporator unit 13, which is linked up with the extractor 11 and the extractor separator 17, is used to receive and heat the extraction fluid and the constituent (or constituents) dissolved in the extraction fluid from the extractor 11, and the extraction fluid becomes gas after heating by the extraction evaporator unit 13.

In one embodiment of this invention, the heating process that heating the extraction fluid and the constituent (or constituents) dissolved in the extraction fluid to gasify the extraction fluid is more than one stage in the extraction evaporator unit 13. Plural stages of heat process can purify the extracted constituent (or constituents) and ensure that there is almost no extraction fluid that stays in liquid phase.

The extraction separator 17, which is linked up with the extraction evaporator unit 13 and the extraction condenser 15, receives and separates the constituent (or constituents) and the gasified extraction fluid from the extraction evaporator unit 13.

In one embodiment of this invention, the extraction separator 17 further comprises a heater 172, and the extraction separator 17 is also used to perform the heating process by the heater 172. The extraction separator 17 heats the extraction fluid and the constituent (or constituents) dissolved in the extraction fluid to gasify the extraction fluid and to separate the gasified extraction fluid and the constituent (or constituents). The one more heating stage performed by the extraction separator 17 can purify the extracted constituent (or constituents) and ensure that there is almost no extraction fluid that stays in liquid phase.

In one embodiment of this invention, the separator unit 17 is equipped with a residue removal unit (not shown), such as an ultrasound, other vibro-shaker (not shown) or vacuum distillation unit, in order to speed up the extraction fluid residues evaporation from the extracted constituent. Applied vibration can speed up the separation of the extraction fluid residues from the constituents collected in the separator unit 17.

The extraction condenser 15, which is linked up with the extraction separator 17 and the extractor 11, receives the gasified extraction fluid from the extraction separator 17 and recover the extraction fluid from gaseous phase into liquid phase. For example, the extraction condenser 15 can liquefy the gasified extraction fluid by external cooling means as example provided from chilled fluid, gas or external refrigeration unit (not shown). The recovery extraction fluid is recycled and sent to the extractor 11 for the next circulation loop of the extraction process by the extraction condenser 15.

In one embodiment of this invention, the extraction fluid liquefied process is more than one stage. For example, the extraction condenser 15 may further comprise more than one condenser to perform plural stages of liquefied process. Plural stages of liquefied process can ensure that the cooling of the extraction fluid is efficient and there is almost no extraction fluid that stays in gaseous phase. From the condenser 15 the extraction fluid recirculates in the extractor 11 into a close loop system. The recirculation repeats until the constituent is separated and received in a receiver unit 19.

In one embodiment of this invention, the extraction apparatus 10 further comprises an extraction receiving unit 19. The extraction receiving unit 19, which is linked up with the extraction separator 17, is used to receive and store the constituent (or constituents) form the extraction separator 17. For example, the receiving unit 19 receives the constituent (or constituents) form the extraction separator 17 equipped with a residue removal unit (not shown), such as a heated vibro-shaker or vacuum distillation unit.

In another embodiment of this invention, the extraction receiving unit 19 is equipped with a residue removal unit, in a form of mechanical vibration and heating or a vacuum distillation unit, integrated in the extraction separator 17.

In one embodiment of this invention, the extractor 11, the extraction evaporator unit 13, the extraction separator 17, the extraction condenser 15 and/or the extraction receiving unit 19 are operated in a constant pressure. This is the major difference between the subcritical fluid extraction and the supercritical fluid extrication. Under supercritical extraction, the pressure is changed in order to evaporate the fluid and separate the constituent (or constituents).

Figure 3:
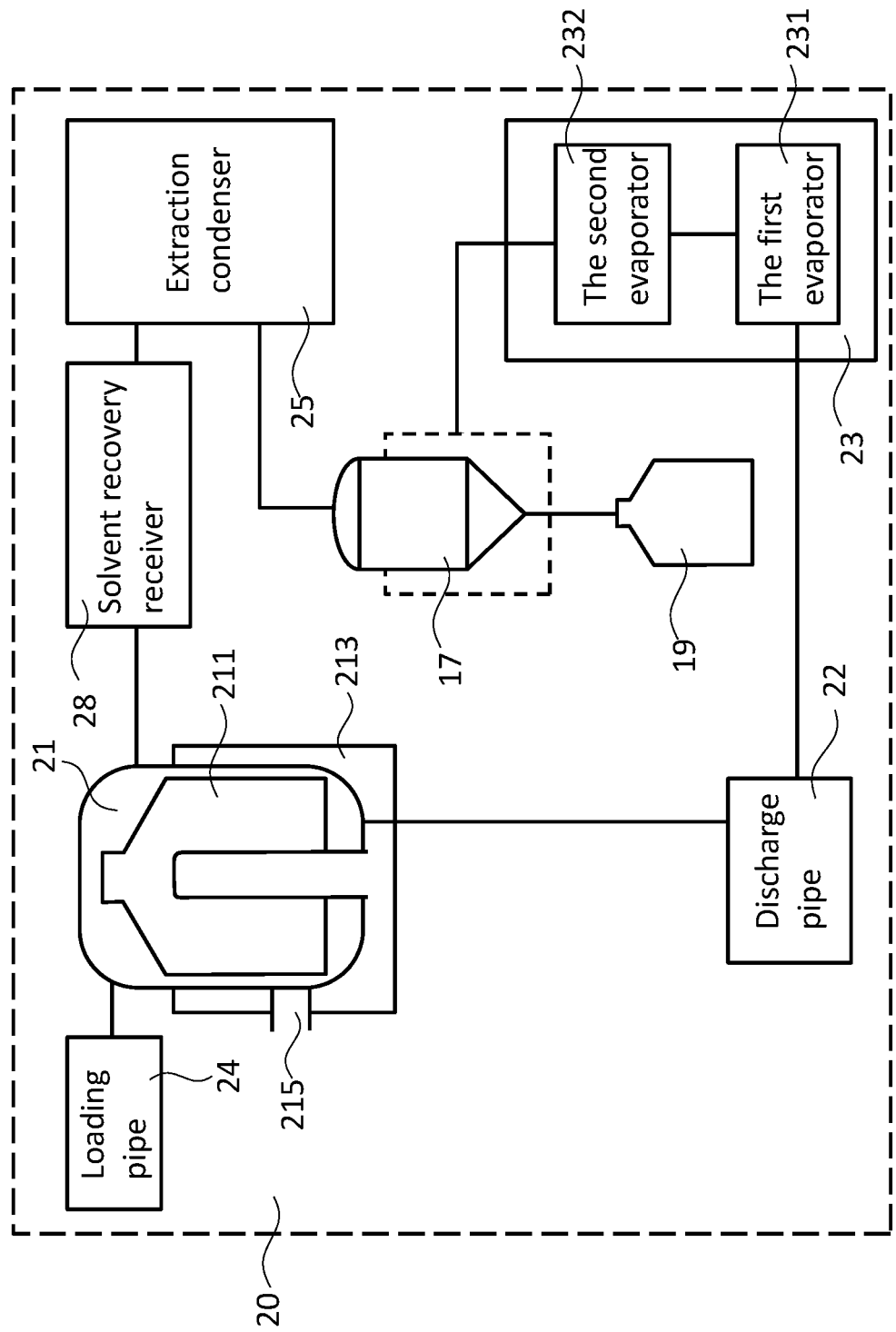
FIG. 3 is a block diagram of an extraction apparatus according to the second embodiment of the present invention.

FIG. 3 is a block diagram of an extraction apparatus according to the second embodiment of this invention. The improved extraction apparatus 20 allows multiple stage of separation for better solvent and constituent separation and multiple stage solvent recovery for better gasifying and storing the solvent before next circulation. The extraction apparatus 20, which is used for extracting at least one constituent in a substance, comprises a loading pipe 24, an extractor 21, a discharge pipe 22, an extraction evaporator unit 23, an extraction separator 17, an extraction condenser 25, a solvent recovery receiver 28 and a receiving unit 19.

The loading pipe 24, which is linked up with the extractor 21, is used to send the substance to the extractor 21. The substance can be sent into the loading pipe 24 by manual means or automated means. For example, the extractor 21 can be further associated with a vacuum system (not shown), and there is a valve between the extractor 21 and the loading pipe 24. The air in the extractor 21 can be evacuated by the vacuum system when the valve is closed, and the substance can be placed in the loading pipe 24 in advance. After evacuating the air from the extractor 21, the valve is opened for inhaling the substance into the extractor 21 from the loading pipe 24 by the pressure difference.

The extractor 21, which is linked up with the loading pipe 24 and the discharge pipe 22, is used to place the substance and an extraction fluid constituted by a subcritical fluid. The constituent (or constituents) is extracted by dissolving the constituent (or constituents) in the extraction fluid. The extractor 21 comprises a stirrer 211, a temperature control unit 213 and an opening 215. Similar to the first embodiment, the stirrer 211 is used to stir and mix the substance and the extraction fluid to increase extraction efficiency. The temperature control unit 213 is used to control the temperature of the extractor 21 to keep the extraction fluid stay in subcritical state and make the constituent (or constituents) dissolved in the extraction fluid.

The extraction fluid and the constituent (or constituents) dissolved in the extraction fluid is discharged from the extractor 21 to the discharge pipe 22, and the residues of the substance is present in the extractor 21 and then discharged by the opening 215 of the extractor 21.

The discharge pipe 22, which is linked up with the extractor 21 and the extractor evaporator unit 23, is used to receive the extraction fluid and the constituent (or constituents) dissolved in the extraction fluid form the extractor 21 and send the extraction fluid and the constituent (or constituents) dissolved in the extraction fluid to the extractor evaporator unit 23. The discharge pipe 22 may accommodate a valve, discharge pump and/or additional heating system.

The extraction evaporator unit 23, which is linked up with the discharge pipe 22 and the extractor separator 17, comprises a first evaporator 231 and a second evaporator 232. The first evaporator 231 is linked up with the discharge pipe 22 and the second evaporator 232, and the second evaporator 232 is linked up with the first evaporator 231 and the extraction separator 17.

The first evaporator 231 is used to receive the extraction fluid and the constituent (or constituents) dissolved in the extraction fluid from the extractor 11 to perform the first stage heating process and send the gasified extraction fluid, the constituent (or constituents) and/or the extraction fluid to the second evaporator 232. The second evaporator 232 is used to receive the gasified extraction fluid, the constituent (or constituents) and/or the extraction fluid from the first evaporator to perform the second stage heating process at higher temperature than the first evaporator 231, and the second evaporator 232 sends the gasified extraction fluid, and the constituent (or constituents) to the extraction separator 17.

Similar to the first embodiment, the heating process is that heating the extraction fluid and the constituent (or constituents) dissolved in the extraction fluid to gasify the extraction fluid. After performing the heating process in the evaporator unit 23, the extraction separator 17 separates the constituent from the extraction fluid and further drains the separated constituent to the receiver unit 19 and the evaporated extraction fluid leaves the extraction separator 17 and enters the extraction condenser 25 where it liquefies and is stored in the extraction receiver 28 and it is ready for another extraction cycle. If the extraction is in continues circulation mode, the extraction fluid is in continues flow.

In the second embodiment of this invention, the extraction evaporator unit 23 comprises two evaporators. However, in other embodiment of the invention, the extractor unit 23 can further comprises only one or more than two evaporators for performing heating process, and the last evaporator of the extractor unit 23 is linked up with the extraction separator 17.

The extraction separator 17, which is linked up with the second evaporator unit 232, the extraction condenser 25 and the receiving unit 19, receives and separates the constituent (or constituents) and the gasified extraction fluid from the second evaporator 232.

The extraction condenser 25 is linked up with the extraction separator 17, and the solvent recovery receiver 28, which is linked up with the extractor 21. The extraction condenser 25 is used to receive and liquefy the gasified extraction fluid form the extraction separator 17 and send the liquefied extraction fluid to the solvent recovery receiver 28. The solvent recovery receiver 28 is used to receive and store the liquefied extraction fluid from the extraction condenser 25 and send the extraction fluid to the extractor 21 for the next circulation loop of the extraction process.

In one embodiment of the present invention, the solvent recover receiver 28 is equipped with a cooling mechanism, such as external cooling means as example provided from chilled fluid, gas or external refrigeration unit, for cooling and liquefying extraction fluid one more time to make sure that almost all the gasified extraction fluid transfer into fluid before being transmitted to the extractor 21.

In another embodiment of the present invention, the solvent recover receiver 28 is equipped with a cooling mechanism, such as external cooling means as example provided from chilled fluid, gas or external refrigeration unit, for keeping lower temperature of the extraction fluid to make sure that the extraction fluid stay in liquid phase.

The extraction receiving unit 19, which is linked up with the extraction separator 17, is used to receive and store the constituent (or constituents) form the extraction separator 17.

Figure 4:
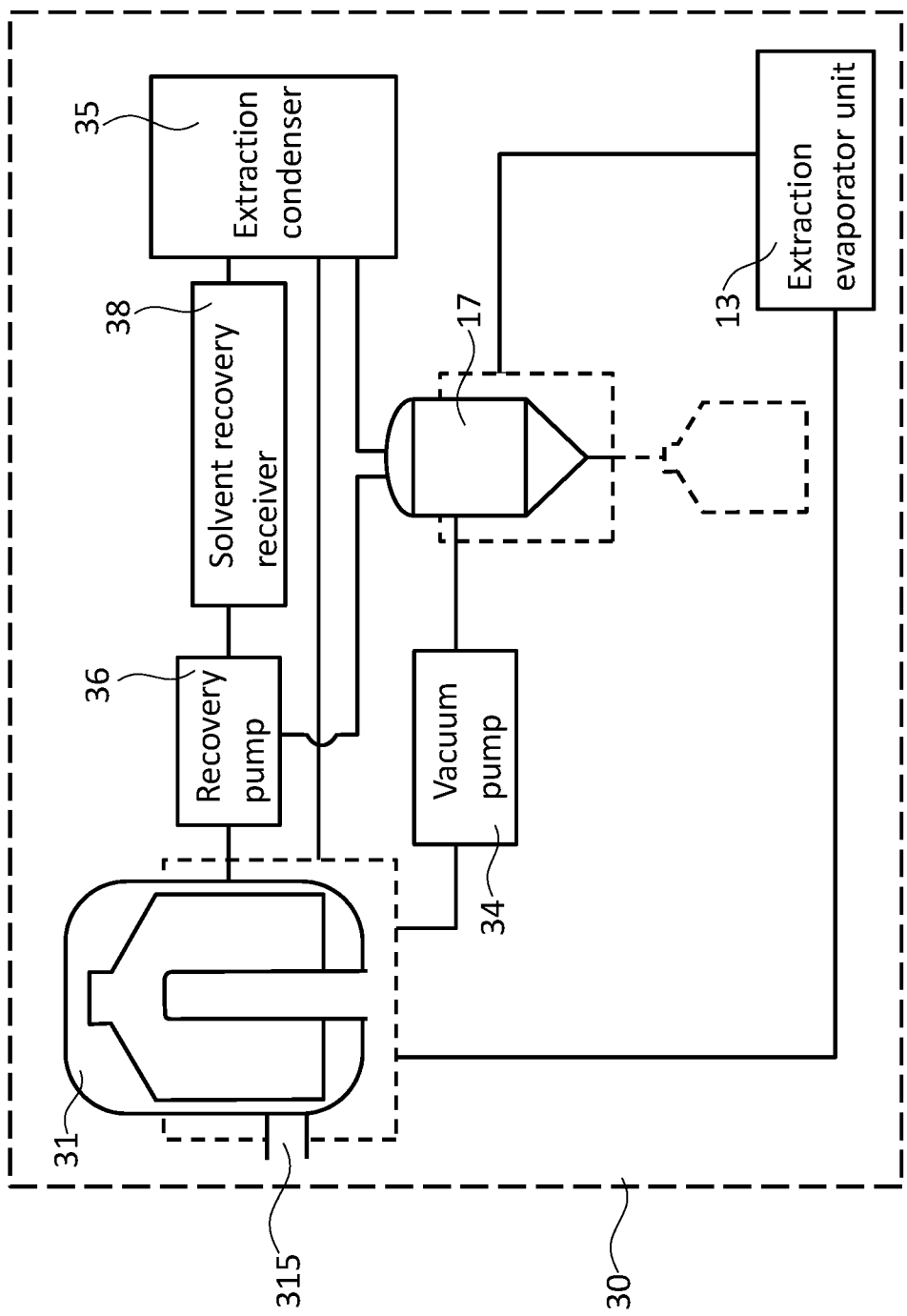
FIG. 4 is a block diagram of an extraction apparatus according to the third embodiment of the present invention.

FIG. 4 is a block diagram of an extraction apparatus according to the third embodiment of this invention. The extraction apparatus 30 comprises an extractor 31, an extraction evaporator unit 13, an extraction separator 17, an extraction condenser 35, a vacuum pump 34, a solvent recovery receiver 38 and a recovery pump 36.

The extraction apparatus 30 of the third embodiment is similar to the extraction apparatus 10 of the first embodiment. The extraction apparatus 30 further comprises a vacuum pump 34, a solvent recovery receiver 38 and a recovery pump 36, and the extractor 31 further comprises an opening 315.

The extractor 31 is linked up with the extraction separator 17, the extraction condenser 35 and the solvent recovery receiver 38 through the recovery pump 36. The solvent recovery receiver 38 is linked up with the extraction condenser 35 and the recovery pump 36. The vacuum pump 34 is linked to the extraction separator 17 and the extractor 31. The vacuum pump 34 evacuates the air from the extractor 31 and extraction separator 17 after they have been opened for cleaning or loading and before next extraction cycle.

In the third embodiment, the extraction process is according to the extraction apparatus 10 of the first embodiment and will not be repeated again. The process in the extraction apparatus 30 is explaining the loading and unloading the extractor 31. After the extraction process the residues of the substance and extraction fluid may be present in the extractor 31. The extractor 31 heats the residues of the substance and extraction fluid for gasifying the extraction fluid, and the residues of the substance in the extractor 31 are drained by the opening 315 while the gasified residue of the extraction fluid is sent to the solvent recovery receiver 38 by a recovery pump 36. The gasified extraction fluid from the extraction separator 17 is also sent to the solvent recovery receiver 38 via the recovery pump 36. The recovery pump 36 is used to compress the gasified extraction fluid in the solvent recovery receiver 38, and then the gasified extraction fluid is send to the extraction condenser 35.

In one embodiment of the present invention, the solvent recovery receiver 38 may comprise the recovery pump 36. In other words, the extractor 31, the extraction separator 17 and the extraction condenser 35 are connected to the solvent recovery receiver 38, which comprises the recovery pump 36.

The extraction condenser 35 performs two functions in the third embodiment. One function is that the extraction condenser 35 is able to receive and liquefy the gasified extraction fluid from the solvent recovery receiver 38 and then send the liquefied extraction fluid to the extractor 31. The other function, which is similar to the extraction condenser 15 in the first embodiment, is that the extraction condenser 35 is able to receive the gasified extraction fluid from the extraction separator 17 and recover the extraction fluid from gaseous phase into liquid phase, and then the recovery extraction fluid is sent and recycled to the extractor 31 for the next circulation loop of the extraction process.

The mechanism structure and function of the extraction evaporator unit 13 and the extraction separator 17 have been described in the first embodiment, and it will not to be repeated here.

Figure 5:
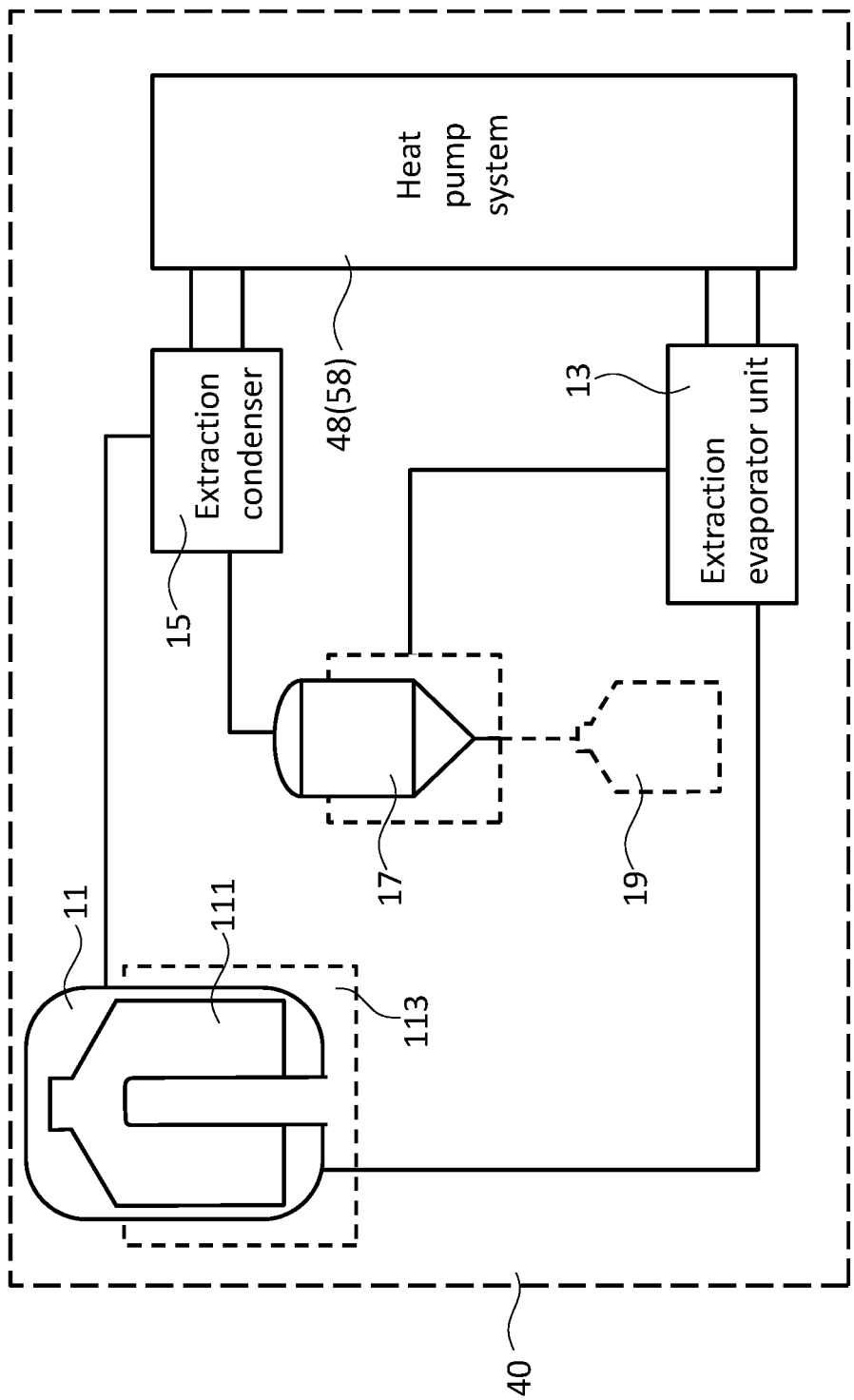
FIG. 5 is a block diagram of improved extraction apparatus according to the fourth and the fifth embodiment of the present invention.
Figure 6:
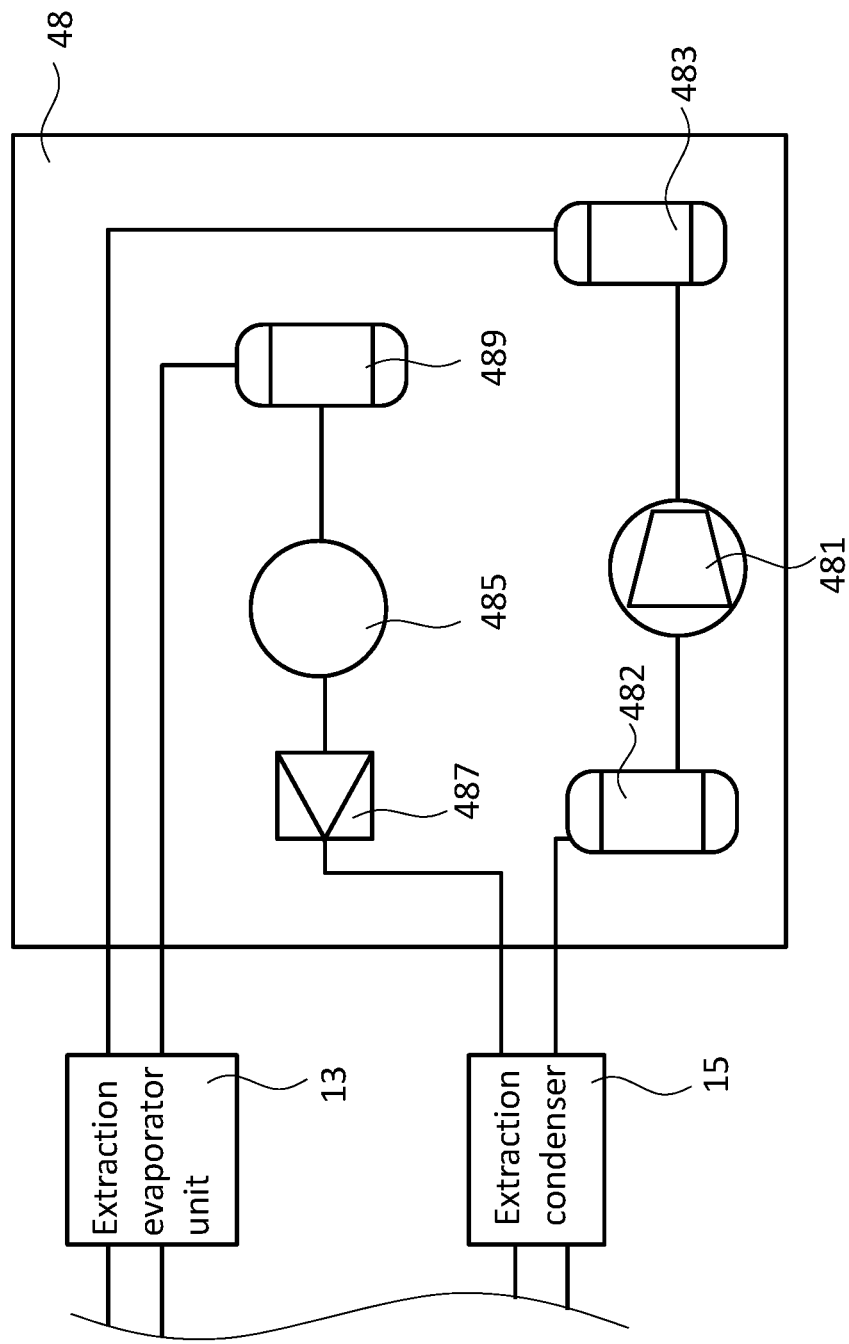
FIG. 6 is a block diagram of a heat pump system according to the fourth embodiment of the present invention.

FIG. 5 is a block diagram of improved extraction apparatus according to the fourth embodiment of this invention, and FIG. 6 is a block diagram of a heat pump system according to the fourth embodiment of this invention. The extraction apparatus 40 comprises an extractor 11, an extraction evaporator 13, an extraction separator 17, an extraction condenser 15, and a heat pump system 48.

The heat pump system 48 is linked up with the extraction evaporator unit 13 and the extraction condenser 15, and the extraction evaporator unit 13 and the extraction condenser 15 exchange heats by thermally integrated with the heat pump system 48. The extraction evaporator unit 13 is a condenser for the heat pump system 48, and the extraction condenser 15 is an evaporator for the heat pump system 48. This way the mutual temperature coupling further improves the efficiency of the system.

The heat pump system 48 comprises an expansion tank 482, a compressor 481, an oil separator 483, a receiver 489, a filter-drier 485 and an expansion valve 487. The extraction condenser 15, the expansion tank 482, the compressor 481, the oil separator 483, the extraction evaporator 13, the receiver 489, the filter-drier 485 and the expansion valve 487 become a closed series loop, and a refrigerant is circulated in the closed series loop.

In one embodiment of the invention, the refrigerant gas is cooled and liquefied by the extraction evaporator unit 13 and then be sent to the receiver 489 for storing. The filter-drier 485 receive the liquefied refrigerant and filter water and/or impurity in the liquefied refrigerant form the receiver 489. The filtered liquefied refrigerant is sent to the expansion valve 487 for decreasing temperature and pressure, and then the liquefied refrigerant with relative low temperature and pressure is sent to the extraction condenser 15.

The liquefied refrigerant is heated in the extraction condenser 15 and become gasified refrigerant. The expansion tank 482 is used to receive the gasified refrigerant for controlling the pressure of the extraction condenser 15 in the operation range. The compressor 481 is used to receive the gasified refrigerant form the expansion tank 482 and compress the gasified refrigerant. The oil separator 483 is used to receive the gasified refrigerant from the compressor 481, filter the lubricating oil of the compressor 481 mixed in the gasified refrigerant is there is any, and send the gasified refrigerant to the extraction evaporator unit 13 for the next circulation loop.

The mechanism structure and function of the extractor 11, the extraction evaporator 13, the extraction separator 17 and the extraction condenser 15 have been described in the first embodiment, and it will not to be repeated here.

Figure 7:
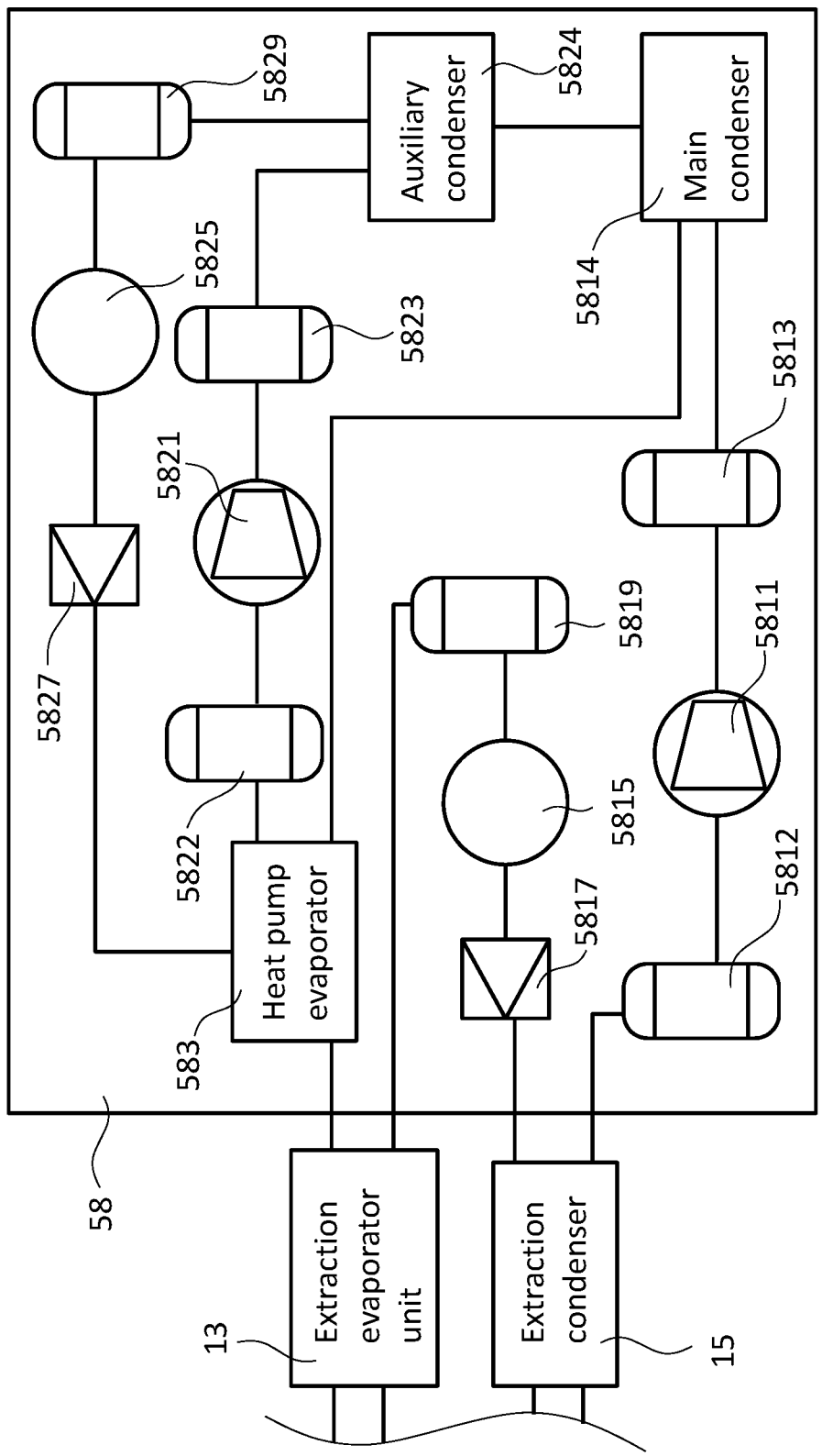
FIG. 7 is a block diagram of improved heat pump system according to the fourth embodiment of the present invention.

FIG. 7 is a block diagram of improved heat pump system according to the fourth embodiment of this invention. Please refer to FIG. 5, which discloses a block diagram of an extraction apparatus according to the fourth embodiment of this invention, the extraction apparatus 40 comprises an extractor 11, an extraction evaporator 13, an extraction separator 17, an extraction condenser 15 and a heat pump system 58.

Similar to heat pump system 48 of the fourth embodiment, the heat pump system 58 is linked up with the extraction evaporator unit 13 and the extraction condenser 15, and the extraction evaporator unit 13 and the extraction condenser 15 exchange heats by thermally integrated with the heat pump system 58. The extraction evaporator unit 13 is a condenser for the heat pump system 48, and the extraction condenser 15 is an evaporator for the heat pump system 58.

The heat pump system 58 comprises a main heat pump loop and an auxiliary heat pump loop. The main heat pump loop comprises the extraction condenser 15, a main expansion tank 5812, a main compressor 5811, a main oil separator 5813, a main condenser 5814, a heat pump evaporator 583, the extraction evaporator unit 13, a main receiver 5819, a main filter-drier 5815 and a main expansion valve 5817. The auxiliary heat pump loop comprises the heat pump evaporator 583, an auxiliary expansion tank 5822, an auxiliary compressor 5821, an auxiliary oil separator 5823, an auxiliary condenser 5824, an auxiliary receiver 5829, an auxiliary filter-drier 5825, and an auxiliary expansion valve 5827. Wherein the heat pump evaporator is shared 583 by the main and auxiliary heat pump loop.

The mechanism structures and functions of the components of the main and the auxiliary heat pump loop in the heat pump system 58 are similar to the components in the heat pump system 48, and it will not to be repeated here. The major difference is that the main and auxiliary heat pump loop in the heat pump system 58 are linked up with each other by that the heat pump evaporator 583 is linked up with the main condenser 5814 and the main condenser 5814 is linked up with the auxiliary condenser 5824.

In one embodiment of the invention, the main condenser 5814 of the main heat pump loop and the auxiliary condenser 5824 of the auxiliary heat pump loop are cooled by an external water flow.

Figure 8:
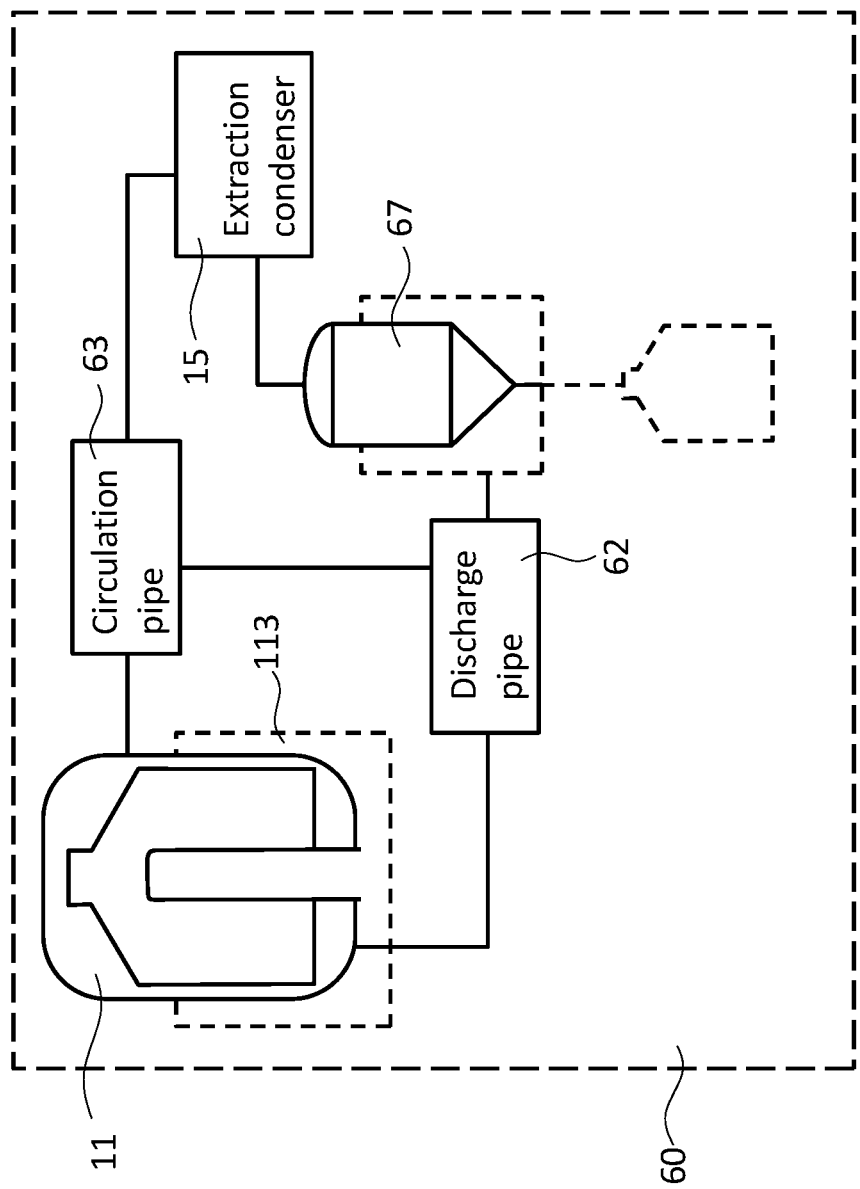
FIG. 8 is a block diagram of an extraction apparatus according to the fifth embodiment of the present invention.

FIG. 8 is a block diagram of an extraction apparatus according to the fifth embodiment of this invention. The extraction apparatus 60 comprises an extractor 11, a discharge pipe 62, a circulation pipe 63, an extraction separator 67 and an extraction condenser 15. The extraction apparatus 60 of this embodiment is similar to the extraction apparatus 10 of the first embodiment. The major difference is that there is no extraction evaporator unit 13 in the extraction apparatus 60.

The extraction separator 67 is used to perform the heating process and then separate the gasified extraction fluid and the constituent (or constituents). To illustrate in detail, the extraction separator 67, which is linked up with the extractor 11 via the discharge pipe 62 equipped with a valve and/or discharge pump (not shown), receives the extraction fluid and the constituent (or constituents) dissolved in the extraction fluid from the extractor 11. The extraction fluid and the constituent (or constituents) dissolved in the extraction fluid are heated by the extraction separator 67, and then the extraction fluid become gas. After the heat process, the gasified extraction fluid and the constituent (or constituents) are separated by the extraction separator 67.

The extraction condenser 15 equipped with a cooler (not shown) is connected with the extractor 11 via circulation pipe 63 equipped with a circulation pump, valve and/or mechanism to preheat the extraction fluid before entering the extractor 11. For example, the circulation pipe 63 may be equipped with a heater to preheat the extraction fluid before entering the extractor 11. In this case the temperature control unit 113 may not be installed. The discharge pipe 62 and the circulation pipe 63 may be connected in a circulation loop. In this embodiment, the temperature control unit 113 is used in order to increase the pressure of the extraction fluid entering the extractor 11 and improve the yield. The mechanism structure and function of the extractor 11 and the extraction condenser 15 have been described in the first embodiment, and it will not to be repeated here.

In one embodiment of this invention, there are four main modes of operation of the extraction apparatus 10/20/30: soaking, soaking with stirring, soaking with circulation and continuous fluid circulation.

The first mode is soaking mode—the extraction fluid stays in the extractors 11/21/31 with the substance for a fixed amount of time. The second mode is soaking with stirring—the extraction fluid is not in circulation, but the substance is stirred in the extractors 11/21/31. For example, the substance is stirred by the stirrers 111/211. The third mode is soaking and circulation—the substance is in contact with the extraction fluid which circulates inside the extractors 11/21/31 through a circulating pump (not shown) and through a short loop between the discharge pipe 62 and the circulation pipe 63.

In other words, the substance and the extraction fluid stay in the extractors 11/21/31 for soaking, stirring or circulating, wherein the substance and the extraction fluid may be circulated with the short and a long loop. The short loop is circulating within the extractors 11/21/31, and the long loop is circulating through the extraction evaporation units 13/23, extraction separators 17/67 and extraction condensers 15/25/35 where the solvent liquefies and enters the extractors 11/21/31 again.

The fourth mode is continuous fluid circulation—the substance is in contact with the extraction fluid, which circulates between the extractors 11/21/31 and the extraction condensers 15/25/35. The mixture extraction fluid and constituent is steady drained from the extractors 11/21/31 to extraction evaporator units 13/23 where the constituents are separated from the solvent and fresh extraction fluid is added in the extractor 11 after liquefying in the condenser 15.

Figure 9:
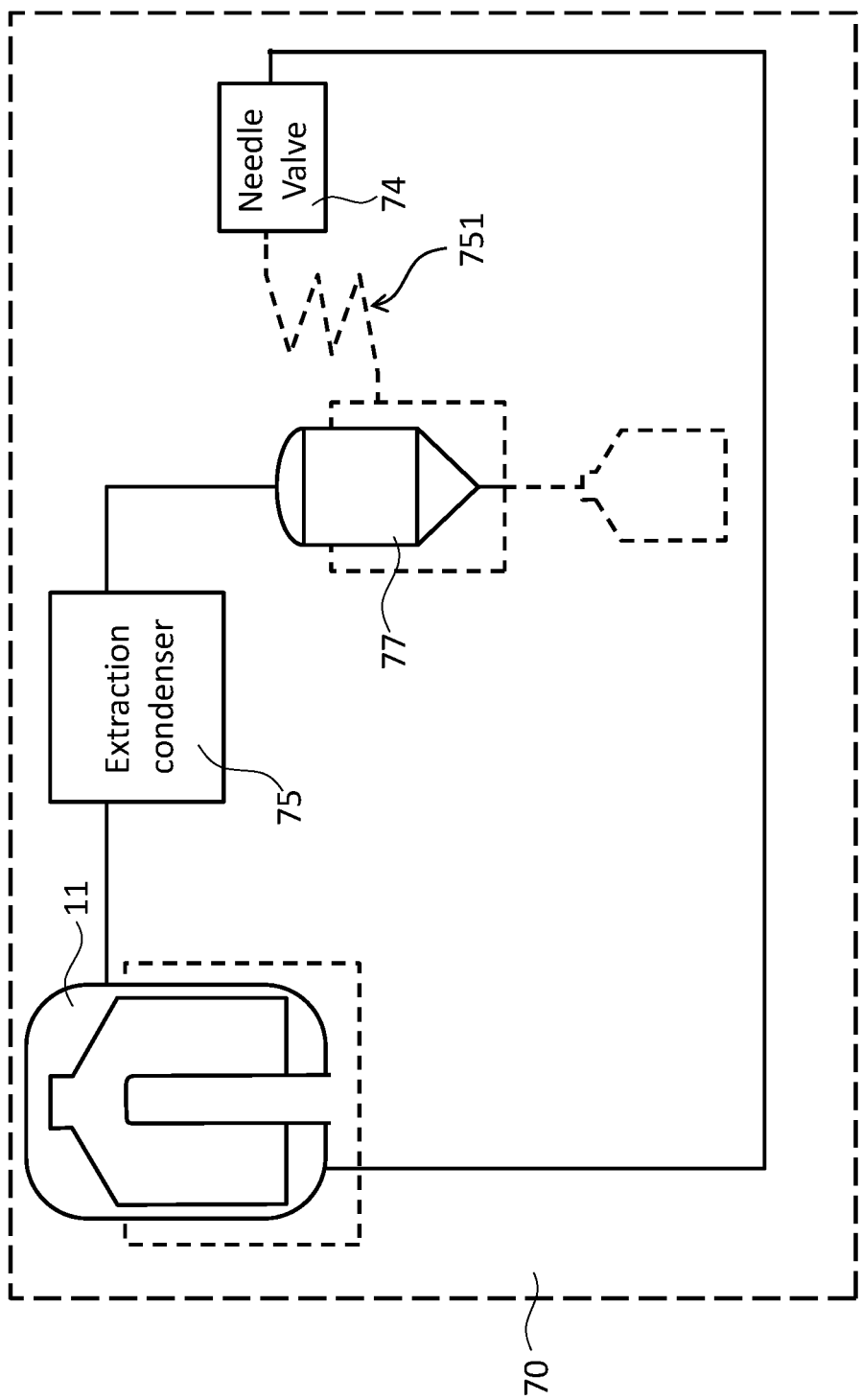
FIG. 9 is a block diagram of an extraction apparatus according to the sixth embodiment of the present invention.
Figure 10:
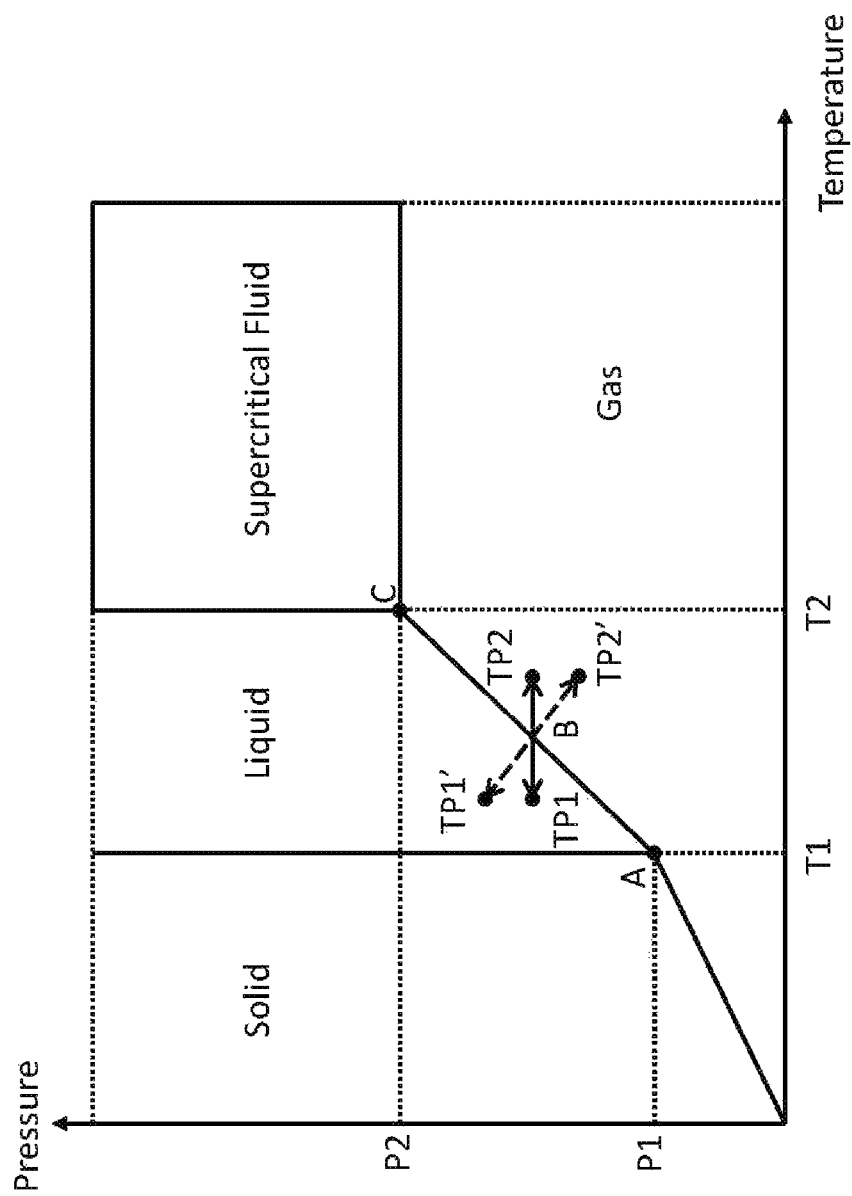
FIG. 10 is a pressure-temperature variation diagram according to the sixth embodiment of the present invention.

FIG. 9 is a block diagram of an extraction apparatus according to the sixth embodiment of the present invention. FIG. 10 is a pressure-temperature variation diagram according to the sixth embodiment of the present invention. In the above embodiments, the extraction apparatus 10/20/30 are operated in constant pressure, as shown as line TP1-TP2 in FIG. 10. However, the extraction apparatus 70 is not operated at constant pressure. In the extraction apparatus 70, the line TP1-TP2 shifts clockwise around the boiling point B and becomes line TP1'-TP2' to make the extraction process become more efficient.

The extraction apparatus 70 comprises an extractor 11, a needle valve 74, an extraction condenser 75 and an extraction separator 77. The extractor 11 is connected with the needle valve 74, and the needle valve 74 is connected with the extraction separator 77. The extraction separator 77 is connected with the extraction condenser 75.

The extractor 11 is used to dissolve the constituent (or constituents) in the extraction fluid. The needle valve 74 receives the extraction fluid and the constituent (or constituents) dissolved in the extraction fluid from the extractor 11, reduces the flow rate of the extraction fluid and the constituent (or constituents) dissolved in the extraction fluid and sends them to extraction separator 77. In one embodiment of this invention, the needle valve 74 further comprises a heating unit which is used to heat and vaporize the mixture solvent constituents in the needle valve 74. In this way, the needle valve 74 can be used to lower the pressure and vaporize the mixture solvent constituents entering the extraction separator 77 behaving as a first stage evaporator 13 from 10/20/30.

In one embodiment of this invention, the extraction apparatus 70 further comprises a serpentine 751. The serpentine 751 linked to the needle valve 74 and the extraction separator 77 further comprises a heating unit which is used to heat and vaporize the mixture solvent constituents in the serpentine 851.

The extraction separator 77 receives and heats the extraction fluid and the constituent (or constituents) dissolved in the extraction fluid for gasifying the extraction fluid and separating the gasified extraction fluid and the constituent (or constituents).

In one embodiment of this invention, the needle valve 74 comprises an aperture for adjusting or changing pressure of the gas in the extraction separator 77 by adjusting the apertures size. For example, when the aperture size is smaller, the extraction separator 77 will receive extraction fluid under lower pressure (point TP2' while the pressure in the extractor 11 is under higher point TP1') and the constituent (or constituents) dissolved in the extraction fluid. Therefore, when the extraction separator 77 heats the extraction fluid and the constituent (or constituents) dissolved in the extraction fluid, less extraction fluid is gasified, and the pressure of the gasified extraction fluid is lowered.

The extraction condenser 75 receives and cools the gasified extraction fluid from the extraction separator 77 for liquefying the gasified extraction fluid, and then the extraction condenser 75 sends the liquefied extraction fluid to the extractor 11 for the next extraction process.

The extraction separator 77 is used to perform heating process and then separates the gasified extraction fluid and the constituent (or constituents). The heating and evaporation process is the function that the extraction evaporator performs, such as the extraction evaporator unit 13/23 in the previous embodiments. In this embodiment, the needle valve 74 performs the first stage evaporator function by gasifying the liquid mixture of extraction fluid and constituents coming from the extractor 11 and entering the separator 77. The separator 77 performs a second stage evaporation and separation of the extraction fluid from the constituents in order to improve the process efficiency.

In one embodiment of this invention, the extraction separator 77, which can also be called extraction evaporator, heats the extraction fluid and the constituent (or constituents) dissolved in the extraction fluid, whose pressure is lower by the needle valve 74 performing the first stage evaporation and mutually cools the extraction condenser 75 liquefying the extraction fluid.

By the extraction apparatus 70, better separation along line TP1'-TP2' as shown in FIG. 10 can be achieved. Line TP1'-TP2' is further from line A-C than line TP1-TP2, wherein the temperature of status TP1 and TP1' are the same while the temperature of status TP2 and TP2' are the same. Therefore, there are more gaseous in status TP2' and more liquid in status TP1'. In other words, it means that there is better separation efficiency in the extraction separator 77.

Figure 11:
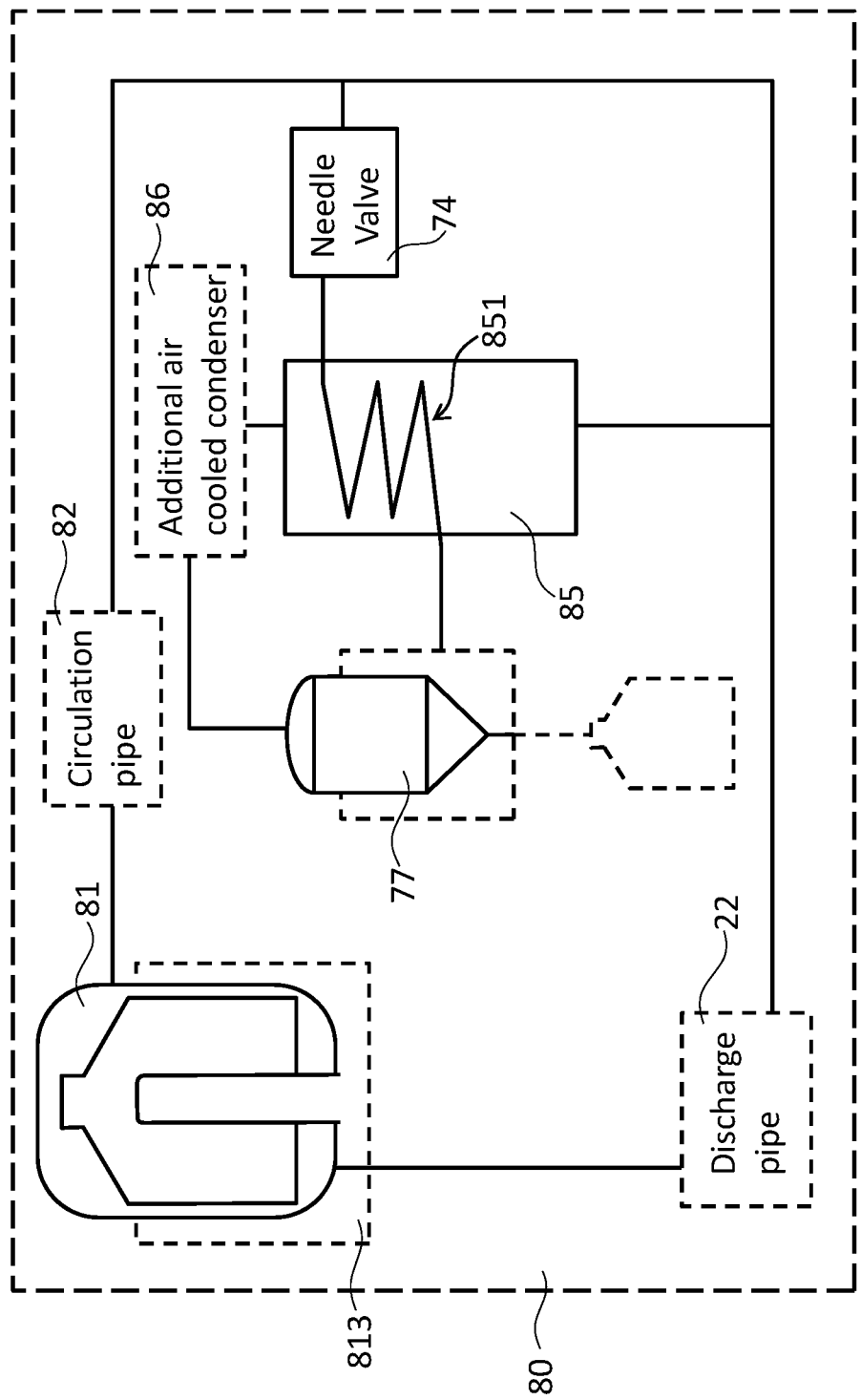
FIG. 11 is a block diagram of an extraction apparatus according to the seventh embodiment of the present invention.

FIG. 11 is a block diagram of an extraction apparatus according to the seventh embodiment of the present invention. The extraction apparatus 80 is another embodiment can achieve line TP1'-TP2' in FIG. 10 and make separation efficiency and/or extraction efficiency higher.

The extraction apparatus 80 comprises an extractor 81, a needle valve 74, an extraction condenser 85 and an extraction separator 77. The extractor 81 is connected with the needle valve 74. The extraction condenser 85 comprising a serpentine 851 is connected with the extraction separator 77 and the extractor 81, and the serpentine 851 is connected with the needle valve 74 and the extraction separator 77.

The extractor 81 is used to dissolve the constituent (or constituents) in the extraction fluid. The needle valve 74 receives the extraction fluid and the constituent (or constituents) dissolved in the extraction fluid from the extractor 71. The needle valve 74 evaporates the mixture extraction fluid and constituents by lowering the flow rate of the extraction fluid and the constituent (or constituents) dissolved in the extraction fluid and sends them to the serpentine 851 with lower temperature.

The serpentine 851 receives and the condenser 85 heats the extraction fluid and the constituent (or constituents) in the extraction fluid, at the same time the lowered pressure extraction fluid and constituents from the needle valve 74 lowers the temperature and cools the gas in the extraction condenser 85 causing its liquefying. Both thermal exchangers are thermally coupled in this embodiment instead electrically coupled which simplifies the connection in 10/20/30. This way the mixture of extraction fluid and constituents are evaporated and heated by the mutual thermal pump and sent to the extraction separator 77. The extraction separator 77 receives and heats the extraction fluid and the constituent (or constituents) dissolved in the extraction fluid for gasifying the extraction fluid and separating the gasified extraction fluid and the constituent (or constituents).

The extraction condenser 85 is using the mutual cooling process explained above, cools the gasified extraction fluid for liquefying, and then the extraction condenser 85 sends the liquefied extraction fluid back to the extractor 81 for the next extraction process. The cooling is provided as example from chilled fluid (not shown), the heat pump system 48 (58) or serpentine 851 later called cooling stage In one embodiment of this invention, the gasified extraction fluid in the extraction condenser 85 heats and evaporates the extraction fluid and the constituent (or constituents) dissolved in the extraction fluid in the serpentine 851 while the extraction fluid and the constituent (or constituents) dissolved in the extraction fluid in the serpentine 851 cools the extraction fluid in the extraction condenser 85 and helps it liquefy. The extraction condenser 85 and the serpentine 851 exchange heat and are thermally integrated with each other. The serpentine 851 can be seen as an evaporator for the extraction fluid and the constituent (or constituents) dissolved in the extraction fluid, and the serpentine 851 can be seen as a condenser for the gasified extraction fluid sent to the extraction condenser 85.

In one embodiment of this invention, the extraction apparatus 80 can further comprise an additional air cooled condenser 86, which is connected with the extraction separator 77 and the extraction condenser 85. The additional air cooled condenser 86 receives and cools the gasified extraction fluid to liquefy the extraction fluid, and then the liquefied extraction fluid is sent to the extraction condenser 85 for cooling and liquefying one more time to make sure that almost all the gasified extraction fluid transfer into fluid before recovering to the extractor 81.

In one embodiment of this invention, the extraction separator 77, which can also be called extraction evaporator, heats the extraction fluid and the constituent (or constituents) dissolved in the extraction fluid, whose flow rate is lower by the adjustment of the needle valve 74, and mutually cools the extraction condenser 85 liquefying the extraction fluid. In other words, the extraction separator 77 (or extraction evaporator) may act as a second evaporator stage to the serpentine 851 and the extraction condenser 85 acts as a second stage condenser to the additional air cooled condenser 86.

In one embodiment of this invention, the extraction apparatus 80 can further comprises a discharge pipe 22 connected with the extractor 81 and the needle valve 74. The needle valve 74 can receive the extraction fluid and the constituent (or constituents) dissolved in the extraction fluid from the extractor 71 via the discharge pipe 22. The discharge pipe 22 can accommodate a valve and/or a discharge pump that allows the extraction fluid and constituents to flow after the extraction process is completed. The circulation pipe 82 may accommodate a circulation pump, valve and/or a heater to preheat the extraction fluid entering the extractor 81.

In one embodiment of this invention, there are four main modes of operation of the extraction apparatus 80: soaking, soaking with stirring, soaking with circulation and continuous fluid circulation. The first and second mode of the extraction apparatus 80 are similar to the extraction apparatus 10/20/30, and the fourth mode of the extraction apparatus 80 is illustrated with the above paragraphs of the seventh embodiment. Therefore, the first, second and fourth mode of the extraction apparatus 80 will not be repeated here.

In the third mode, soaking with circulation, of the extraction apparatus 80, the extraction fluid will circulate inside and outside the extractors 81. In this embodiment, the extraction apparatus 80 can further comprises a circulation pipe 82 connected with the extractor 81 and the needle valve 74. The circulation pipe 82 may be equipped with a valve, a circulation pump and/or mechanism to preheat the extraction fluid before entering the extractor 81. In this case a temperature control unit 813 may not be installed. The extraction fluid is entering the extractor 81 from the extraction condenser 85 via the discharge pipe 22, and the substance is in contact with the extraction fluid inside the extractor 81. In this circulation stage, the extraction fluid will circulate through the extractor 81, the circulation pipe 82, the needle valve 74, the serpentine 851, the extraction separator 77, the extraction condenser 85, and then the extraction fluid circulation back to the extractor 81 via the discharge pipe 22

In the fourth mode, continues fluid circulation, the extraction fluid is entering the extractor 81 from the extraction condenser 85 via the circulation pipe 82, and the substance is in contact with the extraction fluid inside the extractor 81. In this circulation stage, the extraction fluid will circulate through the extractor 81, the discharge pipe 22, the needle valve 74, the serpentine 851, the extraction separator 77, the extraction condenser 85, and then the extraction fluid circulation back to the extractor 81 via the circulation pipe 82.

FIG. 12 is a flow chart of an extraction method according to an embodiment of the invention. The method comprising step S901, step S903, step S905 and step S907, can be applied to any extraction apparatuses 10/20/30/40/50/60/70/80 of above mentioned embodiments. However, the extraction apparatuses 10/20/30/40/50/60/70/80 are not the restrictions of the extraction method in this invention.

The extraction apparatuses 10/20/30/40/50/60/70/80, such as the extraction extractors 11/21/31/81 of the extraction apparatuses 10/20/30/40/50/60/70/80, can be used to mix the substance and an extraction fluid constituted, which is a subcritical fluid, and the extraction apparatuses 10/20/30/40/50/60/70/80 dissolve at least one constituent in the extraction fluid, as shown in step S901, which is a mixing process. The extraction apparatuses 10/20/30/40/50/60/70/80 extract at least one constituent from the substance by dissolving at least one constituent in the extraction fluid. Further, the extraction apparatuses 10/20/30/40/50/60/70/80 may use mixing means to mix the substance and the extraction fluid to improve the extraction efficiency. For example, the substance and the extraction fluid can be mixed by the stirrers 111/211 of the extraction apparatuses 10/20/30/40/50/60/70/80.

After dissolving at least one constituent in the extraction fluid, the extraction apparatuses 10/20/30/40/50/60/70/80, such as the extraction evaporator units 13/23 and/or the extraction separators 17/67/77 of the extraction apparatuses 10/20/30/40/50/60/70/80, heat the extraction fluid and the constituent (or constituents) dissolved in the extraction fluid to gasify the extraction fluid, as shown in step S903, which is a heating process. The purpose of step S903 is used to separate the constituent (or constituents) and the extraction fluid.

After heating the extraction fluid and the constituent, the extraction apparatuses 10/20/30/40/50/60/70/80, such as the extraction separators 17/67/77 of the extraction apparatuses 10/20/30/40/50/60/70/80, separate the gasified extraction fluid and the constituent (or constituents), as shown in step S905, which is a separating process, and drain the constituents while evaporate and recover the extraction fluid.

Finally, the step S907, which is a liquefying process, is that the extraction apparatuses 10/20/30/40/50/60/70/80, such as the extraction condensers 15/25/35/75/85 of the extraction apparatus 10/20/30/40/50/60/70/80, liquefy the gasified extraction fluid. Further the liquefied fluid is re-circulated to mix with the substance. Maintaining a closed loop extraction until all constituents are extracted from the substance.

In one embodiment of this invention, the mixing process S901, the heating process S903, the separating process S905 and the liquefying process S907 may be repeated at least one more time.

In one embodiment of this invention, all the steps S901/S903/S905/S907 of the extraction method are performed under constant pressure and variable temperature, such as the extraction apparatus 10/20/30/40/50/60. The extraction fluid changes its phase from liquid to gas by changing the temperature or pressure. As example according to FIG. 10 in the extractor 11/21/31 the processes are performed at point TP1 while the extraction fluid is in a liquid phase and in the separator when heated the extraction fluid changes to a gaseous phase being in point TP2. All the processes in the extraction apparatuses 10/20/30/40/50/60 reside along the line TP1 to TP2.

A major benefit of the current invention is continues recirculation of the extraction fluid by in process recycling and its safe reuse with multiple materials without cross contamination. The reason for that is that during heating of the mixture of the extraction fluid and constituent (or constituents) while the boiling temperatures in between are great, evaporates the most volatile component, i.e. the extraction fluid. As greater the difference is in the boiling temperatures, sooner the evaporation of the extraction fluid begins. As example the most volatile components of the constituent (monoterpenes) has boiling temperature of 180-250 degrees in normal pressures and of the extraction fluid is 25 degrees, which provides good 200 degree separation. For compare with some existing methods while the extraction fluid has 60-80 degree boiling, the difference is too low and the extraction fluid may be contaminated and requires changing on each batch extraction.

Each extraction fluid has its unique dissolving powers and each extraction fluid dissolves a substance or a set of substances defined in its physical properties. When the extraction fluid fully exhausts the substance and all constituents from the substance are extracted with the type of extraction fluid used, the extraction fluid is recovered in the solvent recovery receiver 28/38. At this stage before the substance is removed from the extraction extractors 11/21/31/81 and the extraction extractors 11/21/31/81 depressurized a second set of extraction fluid with different properties can be circulated through the same extraction extractors 11/21/31/81 that contains the same substance already extracted with the first extraction fluid. If the second extraction fluid is selected to extract a different constituent or set of constituents the second extraction will yield different constituents. The process my repeat until the new extraction fluid exhausts the substance and all constituents are extracted.

In other words, more than one different extraction fluid can be used to extract more than one different constituent from the substance in multiple sequential extraction cycles, wherein each sequential extraction cycle comprising step S901, step S903, step S905 and step S907.

For example, two sequential extraction cycles can be performed if there are two different constituents, a first constituent and a second constituent, comprised of the substance need to be extracted. The first constituent can be extracted with a first extraction fluid in the first sequential extraction cycle, and then the second constituent can be extracted with a second extraction fluid, wherein the first and the second extraction fluid are both subcritical fluids.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. An extraction apparatus for extracting at least one constituent in a substance, comprising:
   an extraction apparatus having an extractor for receiving said substance and a subcritical extraction fluid, said at least one constituent in said substance being dissolved in said subcritical extraction fluid;
   a discharge pipe fluidly coupled to said extractor for receiving said subcritical extraction fluid and said at least one constituent dissolved in said subcritical extraction fluid from said extractor, wherein said discharge pipe accommodates a discharge pump, a valve and an additional heating system;
   an extraction separator fluidly coupled to said discharge pipe for receiving and heating said subcritical extraction fluid and said at least one constituent dissolved in said subcritical extraction fluid from said discharge pipe to gasify said subcritical extraction fluid and separate said at least one constituent and said gasified subcritical extraction fluid;

an extraction condenser fluidly coupled to said extraction separator for receiving and liquefying said gasified subcritical extraction fluid from said extraction separator, wherein said extractor, said extraction separator and said extraction condenser are operated under constant pressure; and a circulation pipe fluidly coupled to said extractor and said extraction condenser for receiving said liquefied subcritical extraction fluid from said extraction condenser and sending said liquefied subcritical extraction fluid to said extractor, wherein said circulation pipe comprises a circulation pump, a valve and a heater to preheat the subcritical extraction fluid entering the extractor, wherein said extractor, said discharge pipe, said extraction separator, said extraction condenser and said circulation pipe forming a long circulation loop for said subcritical extraction fluid to circulate therein when said extractor operates in a continuous fluid circulation mode, and said circulation pipe being directly connected with said discharge pipe to form a short circulation loop from said extractor, through said circulation pipe and said discharge pipe for said subcritical extraction fluid to circulate therein when said extractor operates in a soaking and circulation mode.

2. The extraction apparatus according to claim 1, wherein said extractor comprises a stirrer for stirring and mixing said substance and said subcritical extraction fluid in said extractor.

3. The extraction apparatus according to claim 1, wherein said extractor comprises a temperature control unit for controlling temperature of said extractor for keeping said subcritical extraction fluid as a subcritical fluid and permitting said at least one constituent to be dissolved in said subcritical extraction fluid.

4. An extraction method of said extraction apparatus of claim 1, comprising steps of:

performing a mixing process in said extractor to mix a first subcritical extraction fluid, and a substance comprising a first constituent;

maintaining the first subcritical extraction fluid in a subcritical state within said extractor by controlling the temperature within the extractor;

dissolving said first constituent in said first subcritical extraction fluid;

performing a two step heating process by said first evaporator and said second evaporator to heat said first subcritical extraction fluid and said first constituent dissolved in said first subcritical extraction fluid to gasify said first subcritical extraction fluid, wherein said first evaporator receives said first subcritical extraction fluid and said first constituent dissolved in said subcritical extraction fluid from said extractor to perform a first stage heating process and sends said gasified first subcritical extraction fluid, said first constituent, and said first subcritical extraction fluid to said second evaporator, and said second evaporator receives said gasified first subcritical extraction fluid, said first constituent, and said first subcritical extraction fluid from said first evaporator to perform a second stage heating process at higher temperature than the first evaporator and sends said gasified first subcritical extraction fluid and said first constituent to said extraction separator;

performing a separating process by said extraction separator to separate said gasified first subcritical extraction fluid and said first constituent;

performing a liquefying process by said extraction condenser to liquefy said gasified first subcritical extraction fluid; and repeating at least one more said mixing process, said heating process, said separating process and said liquefying process.

5. The extraction method according to claim 4, wherein said extraction method is performed under constant pressure.

6. The extraction method according to claim 4, further comprising steps of:

mixing a second subcritical extraction fluid, with said substance comprising a second constituent, and dissolving said second constituent in said second subcritical extraction fluid;

heating said second subcritical extraction fluid and said second constituent dissolved in said second subcritical extraction fluid to gasify said second subcritical extraction fluid;

separating said gasified second subcritical extraction fluid and said second constituent; and liquefying said gasified second subcritical extraction fluid.

\* \* \* \* \*